(12) United States Patent
Schmidt (10) Patent No.: US 9,638,273 B2
(45) Date of Patent: May 2, 2017

(54) BRAKE ASSEMBLY AND A METHOD OF OPERATING A BRAKE ASSEMBLY

(71) Applicant: Messier-Dowty Limited, Gloucester, Gloucestershire (GB)

(72) Inventor: Robert Kyle Schmidt, Cheltenham (GB)

(73) Assignee: Safran Landing Systems UK LTD (GB)

( * ) Notice: Subject to any disclaimer, the term of this patent is extended or adjusted under 35 U.S.C. 154(b) by 0 days.

(21) Appl. No.: 14/422,087

(22) PCT Filed: Jul. 2, 2013

(86) PCT No.: PCT/GB2013/051756
§ 371 (c)(1),
(2) Date: Feb. 17, 2015

(87) PCT Pub. No.: WO2014/029962
PCT Pub. Date: Feb. 27, 2014

(65) Prior Publication Data
US 2015/0204399 A1 Jul. 23, 2015

(30) Foreign Application Priority Data
Aug. 21, 2012 (GB) .................................. 1214896.1

(51) Int. Cl.
*H02K 49/00* (2006.01)
*F16D 63/00* (2006.01)
(Continued)

(52) U.S. Cl.
CPC .......... *F16D 63/002* (2013.01); *B60K 7/0007* (2013.01); *B60L 7/24* (2013.01);
(Continued)

(58) Field of Classification Search
CPC .... B60L 7/006; B60L 7/10; B60L 7/12; B60L 7/18; B60L 7/28; B60T 13/586;
(Continued)

(56) References Cited

U.S. PATENT DOCUMENTS

| 2,317,135 | A | * | 4/1943 | Crittenden | ............. | H02K 49/04 |
| | | | | | | 192/48.2 |
| 3,256,823 | A | * | 6/1966 | Keyes | ...................... | E03B 5/02 |
| | | | | | | 310/105 |

(Continued)

FOREIGN PATENT DOCUMENTS

| AU | 20040237817 | 6/2005 | | |
| DE | 1020242 B | * 11/1957 | ............. | F16D 23/02 |

(Continued)

OTHER PUBLICATIONS

International Search Report for International Application No. PCT/GB2013/051756 mailed Nov. 29, 2013.
(Continued)

*Primary Examiner* — Bradley King
*Assistant Examiner* — Stephen Bowes
(74) *Attorney, Agent, or Firm* — RatnerPrestia (57) ABSTRACT

A brake assembly for a vehicle comprising a wheel comprising a hollow section and a rim, the rim comprising a first portion comprising an electrically conductive material and a second portion adjacent to the first portion comprising a plurality of a permanent magnets and a stator comprising at least one electromagnetic coil arranged to be located within the hollow section of the wheel, wherein the stator is moveable between a first position in which the at least one electromagnetic coil is inductively coupled to the first portion of the rim when the wheel is rotating relative to the
(Continued)

stator, and a second position in which the at least one electromagnetic coil is inductively coupled to the second portion of the rim.

22 Claims, 11 Drawing Sheets

(51) Int. Cl.

| | |
|---|---|
| *B60K 7/00* | (2006.01) |
| *B60T 1/10* | (2006.01) |
| *B60T 8/17* | (2006.01) |
| *B60L 7/24* | (2006.01) |
| *H02K 21/22* | (2006.01) |
| *H02K 49/04* | (2006.01) |
| *H02K 7/12* | (2006.01) |
| *H02K 16/02* | (2006.01) |
| *F16D 61/00* | (2006.01) |
| *B64C 25/42* | (2006.01) |
| *B64C 25/44* | (2006.01) |
| *B60T 13/58* | (2006.01) |
| *B60T 13/74* | (2006.01) |
| *F16D 49/00* | (2006.01) |
| *F16D 121/20* | (2012.01) |
| *H02P 3/04* | (2006.01) |

(52) U.S. Cl.
CPC .............. *B60T 1/10* (2013.01); *B60T 8/1703* (2013.01); *B60T 13/586* (2013.01); *B60T 13/748* (2013.01); *B64C 25/42* (2013.01); *B64C 25/44* (2013.01); *F16D 49/00* (2013.01); *F16D 61/00* (2013.01); *H02K 7/12* (2013.01); *H02K 16/02* (2013.01); *H02K 21/222* (2013.01); *H02K 49/043* (2013.01); *B60K 2007/0053* (2013.01); *B60K 2007/0092* (2013.01); *B60L 2200/10* (2013.01); *F16D 2121/20* (2013.01); *H02K 2213/09* (2013.01); *H02P 3/04* (2013.01); *Y02T 10/641* (2013.01); *Y02T 10/642* (2013.01)

(58) Field of Classification Search
CPC .............. B60T 13/748; F16D 2121/18; F16D 2121/20; F16D 2125/24; F16D 67/06; H02K 49/043; H02K 49/046; H02K 49/04; H02K 49/108; H02K 49/10
USPC ........ 310/76, 77, 92, 93, 105; 188/159, 160, 188/164
See application file for complete search history.

(56) References Cited

U.S. PATENT DOCUMENTS

| | | | | |
|---|---|---|---|---|
| 5,064,029 | A | * 11/1991 | Araki | .................. H02K 49/043 188/164 |
| 5,600,191 | A | 2/1997 | Yang | |
| 5,821,712 | A | 10/1998 | Fittje | |
| 2004/0021385 | A1* | 2/2004 | Six | .......................... H02P 15/02 310/105 |
| 2005/0104469 | A1 | 5/2005 | Zepp | |
| 2005/0224642 | A1 | 10/2005 | Sullivan | |

FOREIGN PATENT DOCUMENTS

| | | | | |
|---|---|---|---|---|
| EP | | 1480321 A1 * | 11/2004 | ........... H02K 49/043 |
| JP | | 2008189029 | 8/2008 | |

OTHER PUBLICATIONS

United Kingdom Intellectual Property Office Combined Search and Examination Report for Application No. GB1214896.1 dated Nov. 19, 2012.
Written Opinion of the International Searching Authority for International Application No. PCT/GB2013/051756 mailed Nov. 29, 2013.

* cited by examiner

BRAKE ASSEMBLY AND A METHOD OF OPERATING A BRAKE ASSEMBLY

This application is a U.S. National Phase application of PCT International Application No. PCT/GB2013/051756, filed Jul. 2, 2013, which claims the benefit of GB 1214896.1, filed Aug. 21, 2012, both of which are incorporated herein by reference.

FIELD TO THE INVENTION

The present invention relates to brake assemblies and in particular electromagnetic brake assemblies and methods of operation thereof.

BACKGROUND TO THE INVENTION

State of the art brake technologies implemented on aircraft landing gear generally rely exclusively on friction materials to dissipate the kinetic energy associated with motion of an aircraft. In addition, the brake assembly in an aircraft landing wheel occupies substantially all of the wheel cavity, meaning that any electric taxi solution involves mounting a prime mover external to the wheel cavity which takes up valuable space when the landing gear is retracted into the fuselage, and increases wind resistance and noise when the landing gear is deployed.

SUMMARY OF THE INVENTION

According to a first aspect of the invention, there is provided a brake assembly for a vehicle comprising a wheel comprising a hollow section and a rim, the rim comprising a first portion comprising an electrically conductive material and a second portion adjacent to the first portion comprising a plurality of a permanent magnets; and a stator comprising at least one electromagnetic coil arranged to be located within the hollow section of the wheel, wherein the stator is moveable between a first position in which the at least one electromagnetic coil is inductively coupled to the first portion of the rim when the wheel is rotating relative to the at least one electromagnetic coil, and a second position in which the at least one electromagnetic coil is inductively coupled to the second portion of the rim.

Thus, the brake assembly can be configured in two modes—a first mode in which the assembly provides a braking force on the wheel and a second mode in which the assembly generates power due to rotation of the wheel, or wherein the arrangement is operated as a brushless DC motor driven in a direction opposite to the direction of rotation of the wheel.

Preferably, in the first position, the stator is aligned with the majority of the first portion of the rim, thereby maximising the inductive coupling between the at least one electromagnetic coil and the first portion of the rim.

Advantageously, in the second position, the stator is aligned with the majority of the second portion of the rim, thus maximising the inductive coupling between the at least one electromagnetic coil and the second portion of the rim.

Preferably, the brake assembly comprises at least two stators each comprising at least one electromagnetic coil, the stators being moveable into a third position in which one of the at least one electromagnetic coil is inductively coupled to the first portion and a different one of the at least one electromagnetic coil is inductively coupled to the second portion. Thus, eddy braking force can be provided to the wheel at the same time as either generating power from rotation of the wheel due to forward motion of the vehicle or at the same time as one or more of the at least one coil is driven so as to provide a braking torque on the wheel.

Advantageously, the first portion of the rim is separated from an outer surface of the rim by an insulating material. The insulating material therefore inhibits the conduction of heat generated in the rim due to the rim's inductive interaction with the at least one electromagnetic coil, to any tyre mounted on the rim, thus preventing breakdown of tyre material.

Preferably, the wheel comprises thermally conductive material arranged to dissipate heat generated by electromagnetic interactions between the at least one electromagnetic coil and first and/or second portions of the rim, thus preventing localised heating and breakdown of landing gear components.

Advantageously, the or each stator is moveable in a direction parallel to the rotational axis of the wheel.

Preferably, movement of the or each stator is provided by an electrical, mechanical, or hydraulic actuator. Thus, movement of the stators can be controlled remotely.

The electrical, mechanical or hydraulic actuator may be a linear actuator or a rotational actuator.

Movement of the or each stator may be driven by a screw actuator which engages with a thread integral to the inside surface of one or more of the stators.

The brake assembly may further comprise a coil control module coupled to at least one of the electromagnetic coils. Preferably, the coil control module is configured to receive and/or provide power to the at least one of the electromagnetic coils. The coil control module may be coupled to at least two electromagnetic coils and configured to receive and/or provide power to at least two of the electromagnetic coils independently. Independent control provides redundancy in case of failure of one of the coils or control systems. Moreover, independent control of each coil means that coils inductively coupled to the magnetic second portion of the rim can be driven so as to operate the arrangement as a brushless DC motor, providing a rotational force to the rim of the wheel.

The brake assembly may further comprises a friction brake comprising a first brake element integral to one or more of the stators and a second brake element attached to or integral to a fixed portion of the vehicle and wherein the or each stator is moveable into a fourth position in which the first brake element engages with the second brake element to inhibit rotation of the wheel. Accordingly, no power is required to maintain braking whilst the vehicle is parked. The friction brake also provides further redundancy and may be used in case of an emergency as further braking.

According to a second aspect of the invention, there is provided an aircraft landing gear comprising a brake assembly described above.

According to a third aspect of the invention, there is provided a method of operating a brake assembly as described above, the method comprising: during a first phase in which the wheel is rotating at a first angular velocity, moving the stators into the first position and applying a current to at least one of the electromagnetic coils inductively coupled to the first portion of the rim, so as to induce eddy currents in the first portion of the rim; during a second phase in which the wheel is rotating at a second angular velocity, the second angular velocity being less than the first angular velocity, moving the one ore more stators into the second position wherein at least one of the electromagnetic coils is inductively coupled to the second portion of the rim. Thus, when the vehicle is travelling at high speed, the braking assembly is operated in an eddy braking mode, in which the electromagnetic coils are driven to induce an electromotive braking force on the rim of the wheel in order to reduce the speed of the vehicle.

Then, when the vehicle speed reduces to an intermediate velocity, during the second phase, the rim may induce an electric current in at least one electromagnetic coil, the brake assembly operating in a generation mode in which rotation of the wheel due to kinetic energy associated with the motion of the vehicle generates power in the electromagnetic coils associated with the second portion of the rim.

Alternatively, during the second phase, a current is applied to the at least one electromagnetic coil coupled to the second portion of the rim to induce a torque on the rim in a direction opposite to the direction of rotation of the wheel, thus providing a braking force on the wheel.

Advantageously, the method further comprises: during a third phase occurring between the first phase and the second phase, moving the or each stator into a third position in which: at least one of the electromagnetic coils is applied with a current and is inductively coupled to the first portion of the rim, and at least one of the electromagnetic coils is inductively coupled to the second portion of the rim such that an electric current is induced in the at least one electromagnetic coil coupled to the second portion of the rim. Thus, power generation and eddy current braking can be performed simultaneously.

Preferably, the electric current induced in the at least one electromagnetic coil coupled to the second portion of the rim contributes to the current applied to the at least one electromagnetic coils coupled to the first portion of the rim. Thus the electromotive braking force can be increased with no additional power required.

Preferably, the method further comprises: during a fourth phase in which the one or more stators are in the second or the third position, driving at least one of the electromagnetic coils coupled to the second portion of the rim so as to induce a rotational force on the rim. The fourth phase may, for instance, occur after the second phase and the induced rotational force may be in a direction opposite to the direction of rotation of the wheel, thus inhibiting the forward rotation of the wheel and accordingly the vehicle.

Advantageously, the method further comprises: during a fifth phase occurring before the first phase in which the stators are in the second position, applying a current to at least one of the electromagnetic coils coupled to the second portion of the rim so as to induce a rotation force on the rim to increase the angular velocity of rotation the wheel. Thus, when the brake assembly is fixed to an aircraft landing gear, rotation of the wheel can be induced prior to touch down of an aircraft, thereby reducing loads associated with spin-up and spring back of the aircraft landing gear.

The brake assembly can therefore be operated in both a motor state in which the at least one coil drives the wheel forward or backward, and a state in which the at least one coil provides a braking force to the wheel.

Advantageously, during the sixth phase, the stators are moved into the fourth position in which the first and second brake elements engage to inhibit rotation of the wheel. Thus, when the vehicle is stationary and parked, no power need be provided to the brake assembly.

BRIEF DESCRIPTION OF THE DRAWINGS

The present invention will now be described, by way of non-limiting example only, with reference to the accompanying drawings in which.

DETAILED DESCRIPTION OF EMBODIMENTS

Figure 1:
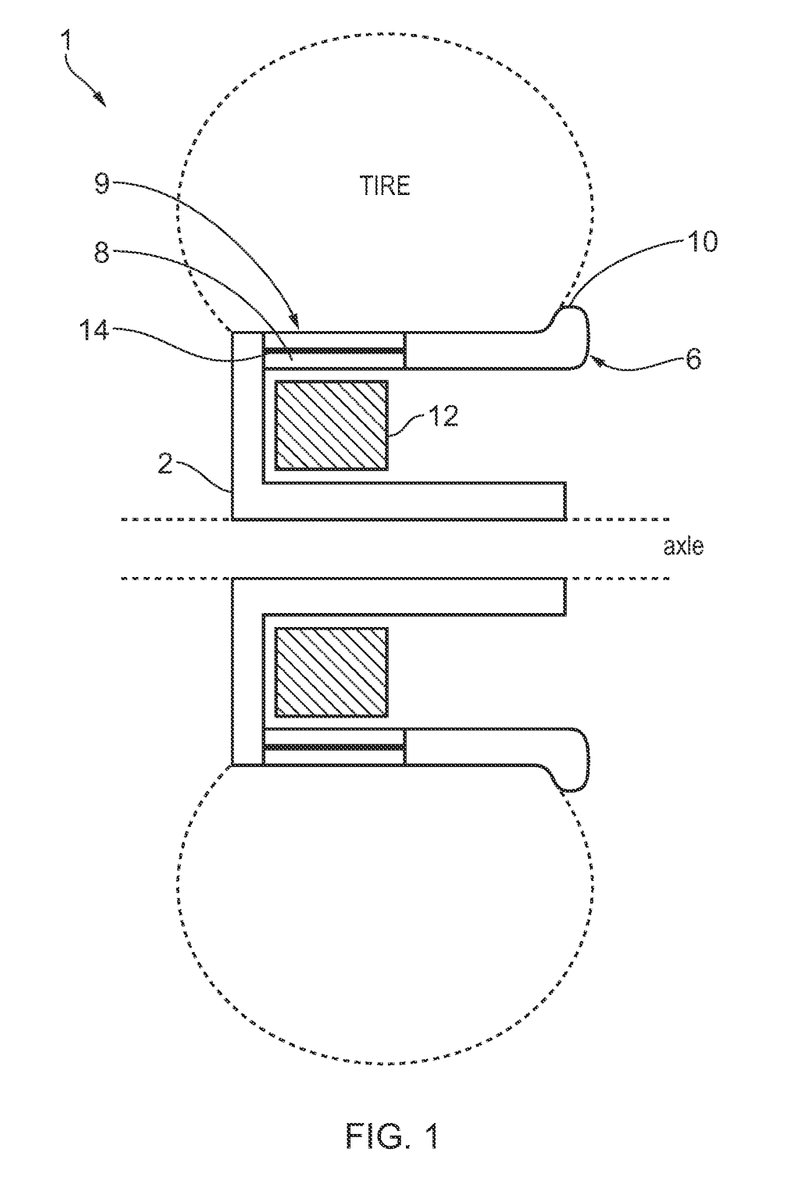
FIG. 1 is a side cross-section of a brake assembly according to an embodiment of the present invention.

FIG. 1 shows a cross section of a wheel comprising a brake assembly according to an embodiment of the present invention. The wheel 2 is rotatable about an axle and comprises a rim 6, which extends around the perimeter of the wheel 2. The rim 6 defines the outer edge of a hollow section 4 between the rim 6 and the axle.

The rim 6 of the wheel 2 is preferably constructed so as to provide a surface upon which to mount a tyre, in accordance with any known method. The rim 6 comprises two portions 9, 10, adjacent to each other along a direction parallel to the rotational axis of the wheel 2, each portion 9, 10 extending around the rim 6 wheel 2. Disposed within the first portion 9 of the rim 6 is an electrically conductive material 8, such as silver or copper. An insulator such as a ceramic or plastic, may also be included in the first portion 9, arranged to prevent heat generated in the conductive material 8 from heating a tyre mounted on the exterior of the rim 6. Heating of the conductive material of the first portion of the rim 6 will be discussed in more detail below. The second portion 10 of the rim 6 includes a magnetic material. The magnetic material preferably comprises one or more rare earth magnets or lanthanide elements having high magnetic anisotropy, but could also be formed of any magnetic material known in the art.

Figure 3:
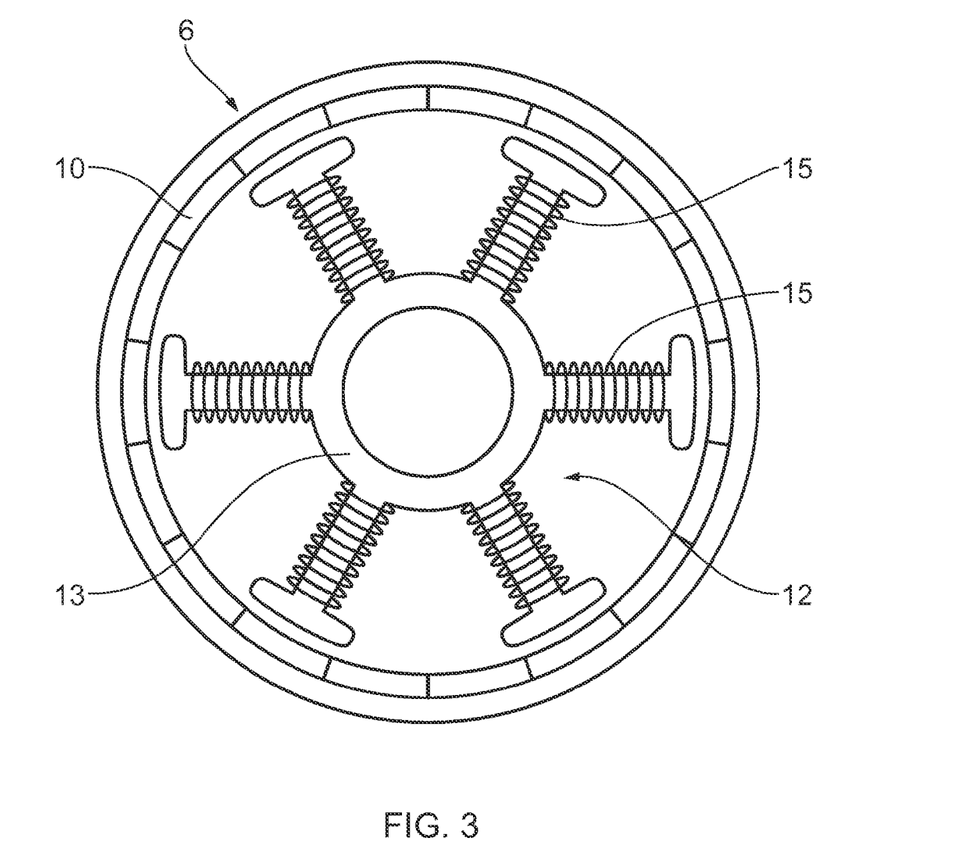
FIG. 3 is a front view of a brake assembly according to an embodiment of the present invention.

An electromagnetic stator 12 is disposed within the hollow section 4 of the wheel 2. A front view of an embodiment of the stator 12 is shown in FIG. 3, having an axial centre concordant with that of the rotational axis of the wheel 2. In the embodiment shown, the stator 12 has a central portion 13 with a plurality of electromagnetic coils 15 extending radially outward from the central portion 13 towards the interior surface of the rim 6. Six electromagnetic coils are arranged in pairs to form 3 poles in FIG. 3. However, any number of coils or other stator arrangements known in the art may be used. For example, a single electromagnetic coil with two dipoles extending outward from the axial centre of the wheel 2, or any number of coils fixed inside the rim 6 so as to be inductively coupled to the conductive first or magnetic second portions 9, 10 of the rim 6.

Figure 2:
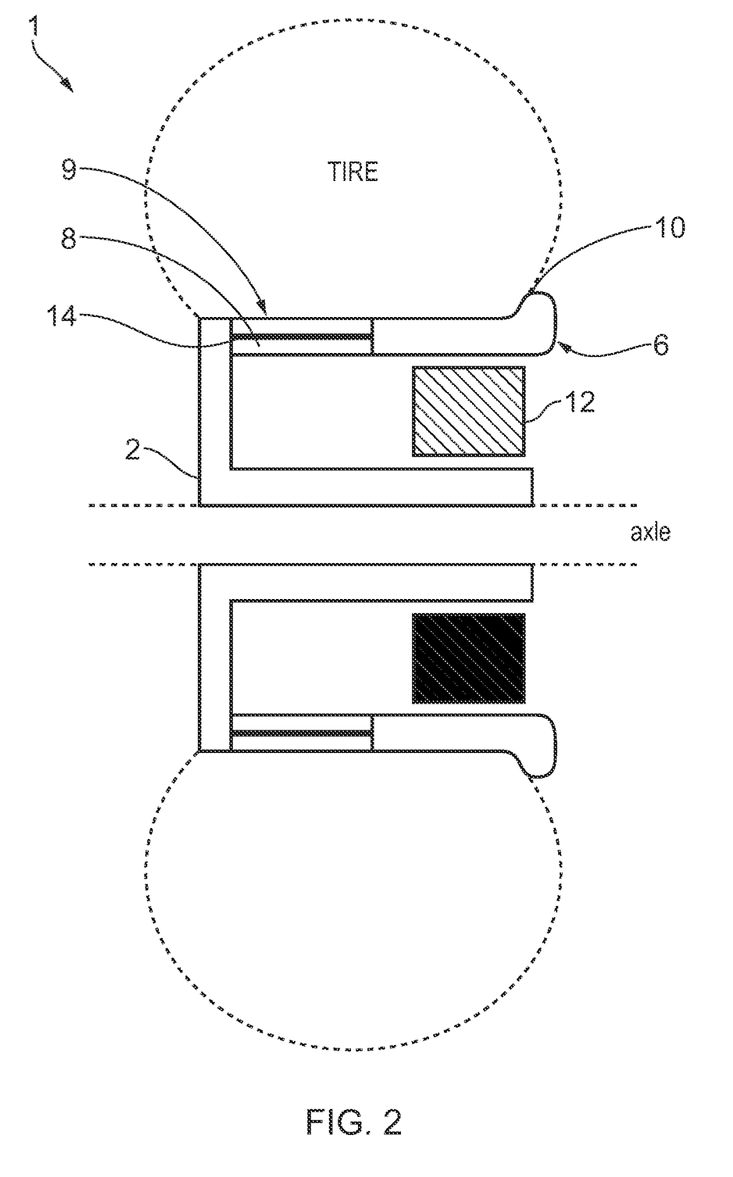
FIG. 2 is a side cross-section of the brake assembly shown in FIG. 1, with a coil pack in a different configuration.

The stator 12 is fixed relative to the axle, whereas the wheel 2 is free to rotate about the axle. Thus, the wheel 2 is free to rotate relative to the stator 12. Within the hollow section 4 the stator 12 is moveable in a direction parallel to the rotational axis of the wheel 2. The stator 12 is preferably moveable between two positions. The first position is shown in FIG. 1 in which the radial edge of stator 12 is laterally adjacent to the first portion 9 of the rim 6. FIG. 2 then shows the stator 12 in a second position, the stator 12 being laterally adjacent to the second portion of the rim 6.

To provide appropriate control of the coils, each electromagnetic coil 15 is independently wired to a brake controller which can dynamically switch each coil 15 independently. The brake controller can dynamically drive the coils either to achieve commutation of the arrangement, i.e. providing rotation force to the wheel so that the combination of the electromagnetic coils 15 and the second portion of the rim act as a brushless DC motor. Alternatively, the brake controller can ensure all coils 15 are simultaneously energised to generate eddy currents in the rim 6, as will be described in more detail below.

The embodiments shown in FIGS. 1 to 3, described above, include a single electromagnetic stator 12 disposed within the hollow section 4 of the wheel 2. Preferably however, a plurality of adjacent stators 12 may be disposed within the hollow section 4 of the wheel 2. Multiple stators provide redundancy, in case of failure of one of the coils. Each stator may be operated independently using independent control systems. Moreover, multiple stators provide more braking and power generation capacity than a single unit, together with the ability to provide multi-mode functionality, as will be discussed hereinafter.

Figure 4:
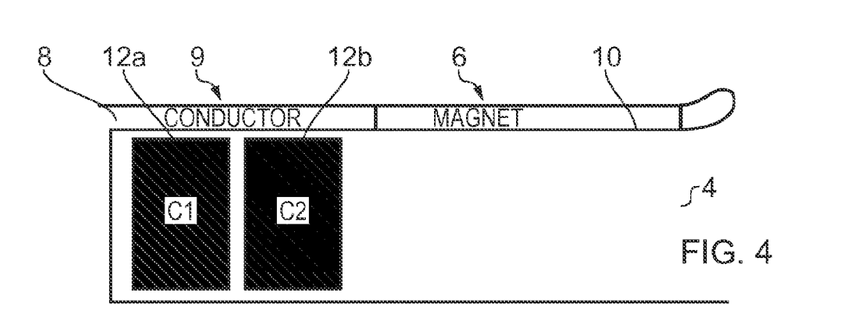
FIG. 4 is a side cross-section of a brake assembly according to an embodiment of the present invention, comprising two stators.
Figure 5:
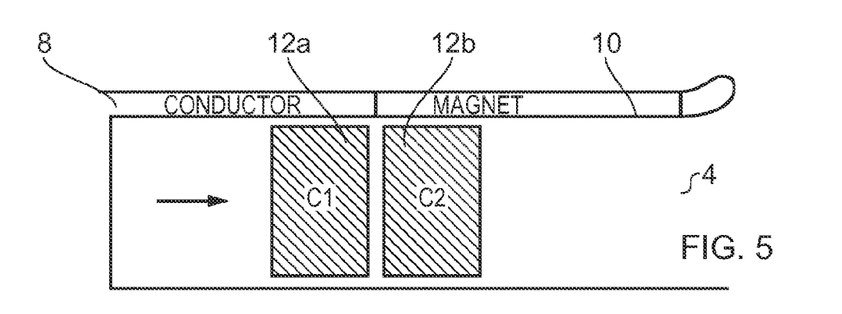
FIG. 5 is a side cross-section of the brake assembly shown in FIG. 4, the stators in a different configuration.
Figure 6:
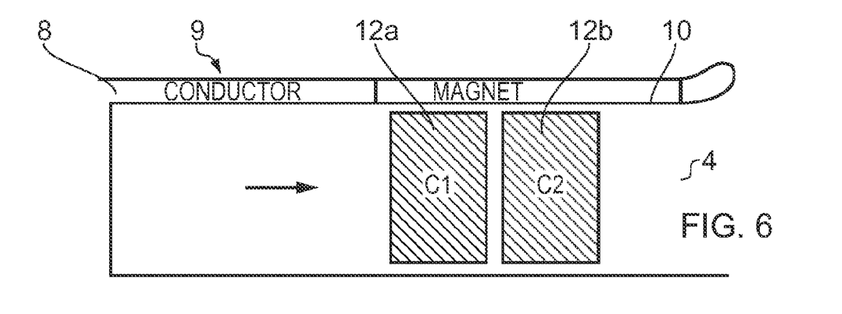
FIG. 6 is a side cross-section of the brake assembly shown in FIG. 4, the stators in a different configuration.

A two stator arrangement is shown in FIGS. 4 to 6. Referring first to FIG. 4, a cross sectional view of a brake assembly according to an embodiment of the present invention is shown, in which like parts are labelled with like numbers. For simplicity, only the top half of the brake assembly 1 is shown. Disposed within the hollow section 4 of the wheel 2 are two stators, 12a, 12b. As with the embodiment shown in FIG. 1, the stators 12a, 12b are fixed relative to the axle so that when the wheel 2 rotates about the axle, there is relative movement between the wheel 2 and the stators 12a, 12b.

As shown in FIGS. 4 to 6 movement of the stators 12a, 12b is permitted in a direction parallel to the longitudinal axis of the axle. Preferably, the stators 12a, 12b are moveable between three positions. In a first position, shown in FIG. 4, the outer edge of stators 12a and 12b are positioned adjacent to the first portion 9 of the rim 6 of the wheel 2. In a second position, shown in FIG. 6, both stators 12a, 12b are positioned such that both of their outer edges are adjacent to the magnetic second portion 10 of the rim 6. Finally, in a third position, shown in FIG. 5, one of the stators 12a is positioned such that its outer edge is adjacent to the conducting first portion 9 of the rim 6 and the other stator 12b is positioned so that its outer edge is adjacent to the magnetic second portion 10 of the rim 6.

The stators 12a, 12b are illustrated in FIGS. 4 to 6 as being separate and spaced apart. However, it will be appreciated that a plurality of stators could be integrated into a single coil pack, the coil pack being moveable as one between the different positions. Alternatively, the stators 12a, 12b may be individually moveable. In other embodiments of the present invention, the brake assembly may comprises any number of coil packs, each being moveable individually or all of the stators being integrated into a single package, moveable as one.

Figure 7:
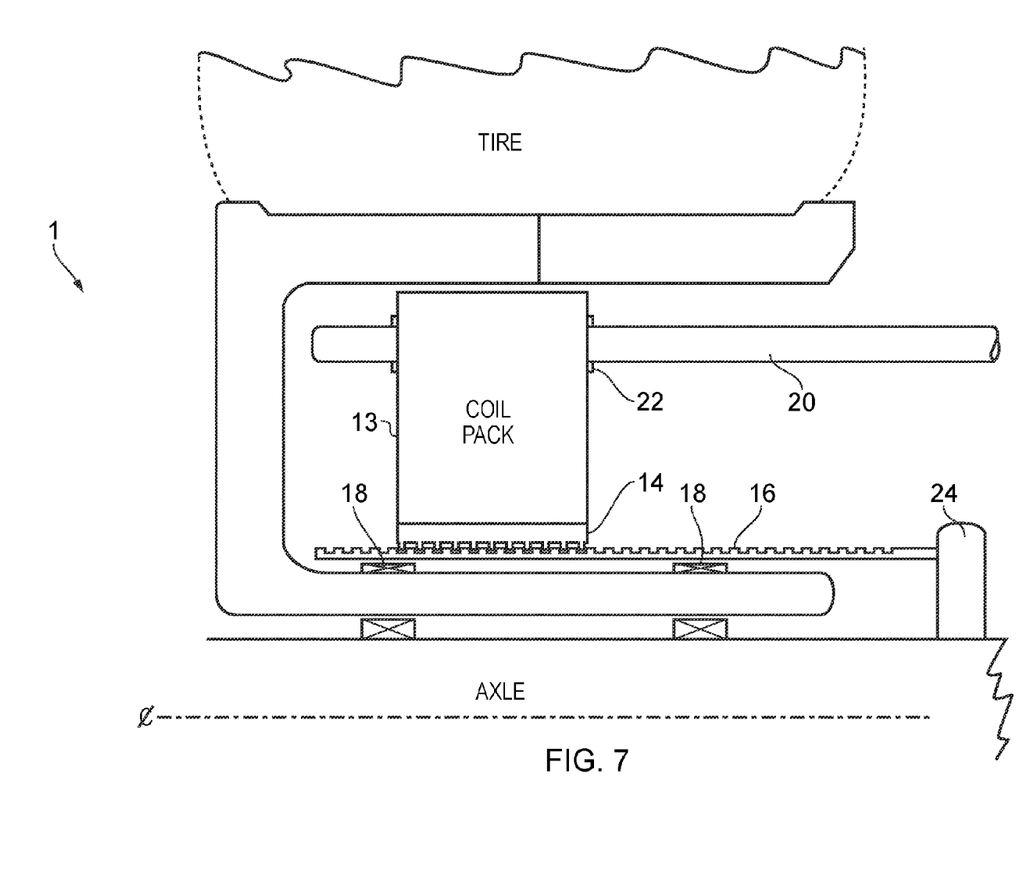
FIG. 7 is a side cross-section of the brake assembly according to an embodiment of the present invention.

An exemplary embodiment of the mechanism for moving the electromagnetic stator(s) 12, 12a, 12b within the hollow section 4 of the wheel 2 is shown in FIG. 7 which shows a cross sectional view of a brake assembly including a wheel 2 in accordance with an embodiment of the present invention. As with FIGS. 4 to 6, only half of the brake assembly has been drawn. A coil pack 13 is disposed within the hollow section 4 of the wheel 2. As with all embodiments of the present invention described herein, each stator 12a, 12b is fixed about the axle so that when the wheel 2 rotates, there is relative rotational movement between the wheel 2 and the coil pack 13. The coil pack 13 may comprise a single stator 12, or a plurality of stators 12a, 12b. The inside edge of the coil pack 13 is provided with a translating nut 14 which engages with a screw thread 16 disposed on the lower inside edge of the hollow section 4. It will be appreciated that in other embodiments the screw thread 16 could be replaced with an acme screw, ball screw or other types of actuation mechanisms known in the art. The screw thread 16 is separated from the inside edge of the hollow section of the wheel 2 by a plurality of needle bearings or bushings 18 which allow for rotation of the wheel 2 about the axle and relative to the screw thread 16.

In addition to engaging with the screw thread 16, the coil pack 13 may also be held in place by one or more torque removal rods 20 disposed through holes within the coil pack 13 via sliding fit bushings 22. The torque removal rods 20 are positioned parallel to the axle and the axis of movement of the coil pack 13. It will be appreciated that other methods may be used to prevent rotation of the coil pack 13 relative to the axle.

The screw thread 16 is connected to a screw thread drive motor and gearing 24, which is operable to rotate the screw thread 16 about its axis, the centre of which is concordant with the rotational axis of the wheel 2. Since the screw thread 16 is engaged with the translating nut 14 of the coil pack 13, on rotation of the screw thread 16 by the screw thread drive motor 24, the coil pack 13 slides along the torque removal rods 20 moving in a direction parallel to the longitudinal axis of the axle. Because of the continuous nature of the movement of the coil pack 13 along the screw thread 16, the coil pack 13 is able to be positioned anywhere along the length of the screw thread 16, provided that the translating nut 14 does not reach the limit of travel of the screw thread 16.

Figure 8:
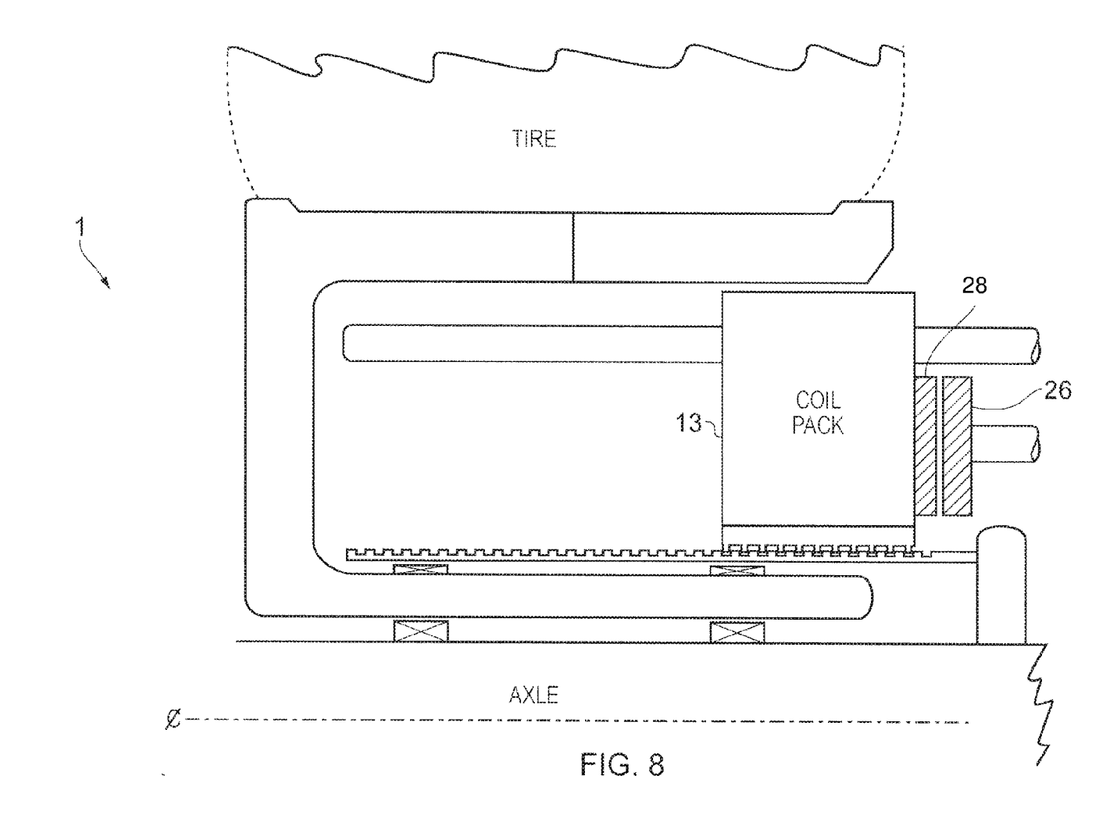
FIG. 8 is a side cross-section of the brake assembly shown in FIG. 7, further comprising a parking brake.

Advantageously, the brake assembly 1 further comprises a parking brake mechanism as illustrated in FIG. 8. A parking brake is shown comprising a first parking brake pad 28 rigidly fixed to the inner most side of the coil perpendicular to the axis of rotation of the wheel, and a second parking brake pad 26, the movement of which is fixed relative to the axle. As the coil pack 13 is moved along the screw thread 16 towards the screw thread drive motor 24 to its inner most position parallel to the axis or rotation of the wheel 2, the first and second brake pads 26, 28 engage so as to inhibit movement of the wheel 2 due to the frictional force between the pads 26, 28. The coil pack 13 is preferably moved into this position once a vehicle to which the brake assembly is attached is stationary, or may be used as an emergency brake in the event of failure of the main electromagnetic braking system or in combination with the electromagnetic braking system in the event of a rejected take-off (RTO) or other emergency.

As discussed, the brake assemblies described above can be operated in a plurality of different modes, depending on the position of the stator 12 or coil pack 13 in relation to the rim 6 of the wheel 2.

Figure 9:
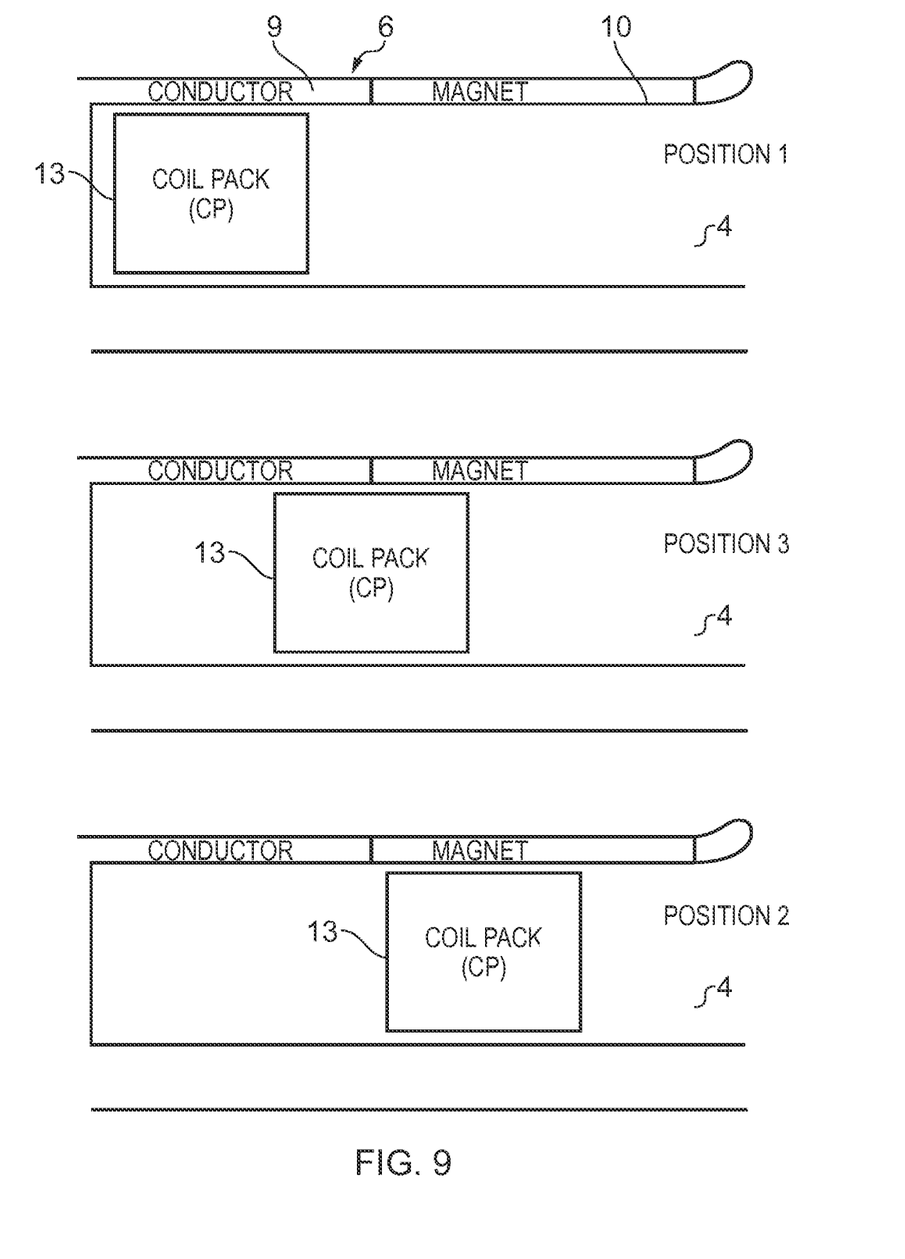
FIG. 9 is a side cross-section of the brake assembly shown in FIGS. 4 to 6 in which the stator(s) are integrated into a single coil pack.

FIG. 9 illustrates some possible configurations of the coil pack 13 within the hollow section 4 of the wheel 2. In the first position, labelled position 1, the stator sits radially inward and adjacent to the conductive first portion 9 of the rim 6. During operation, a current may be applied to one or more of the stators 12 disposed within the coil pack 13. If the wheel 2 is spinning, the magnetic field generated by the coil pack's 13 electromagnetic stator(s) will interact with the conductive first portion 9 of the rim 6 to induce eddy currents in the conductive first portion 9 of the rim 6 which oppose the magnetic field created by the electromagnetic stator(s). These induced eddy currents create a electromotive force between the coil pack 13 (fixed relative to the axle) and the first portion 9 of the rim 6, thereby acting to oppose the rotation of the wheel 2 relative to the coil pack 13 and therefore the axle. This is the principal of circular eddy braking as will be appreciated by the skilled person.

An approximate expression for the power dissipated by eddy currents can be obtained. The electric field induced at any one point in the conductive material 8 of the first portion is given by E=v·B, where v is the velocity of that point relative to the electric field. For a stator comprising a single coil, assuming that the magnetic field B is proportional to excitation current supplied to the coil $I_{ex}$, the following holds true.

$$E \propto \omega I_{ex}$$

So, for any eddy current loop, the induced electromotive force is proportional to $\omega I_{ex}$. According to basic laws of electrical current, power dissipated in a current loop is proportional to the square of the electromotive force and directly proportional to the electrical conductivity of the disk. The same holds for the entire mass of conductive material 8 in the first portion 9 of the rim 6 and accordingly, the following equation can be reached.

$$P_e = K\omega^2 I_{ex}^2 \sigma$$

In light of the above, we can see that when the stator is in position 1 and a current is applied to the coil, the faster the wheel 2 rotates, the stronger the resistive electromotive force. In fact, the power dissipated due to eddy braking is proportional to the square of the angular velocity of the wheel 2. Equally, the higher the conductivity of the conductive material 8 in the first portion 9, the stronger the force induced by eddy currents in the conductive material 8.

In accordance with the above phenomenon, power is dissipated as heat in the conductive material 8 disposed in the first portion 9 of the rim 6. Thus, as mentioned above, the first portion 9 preferably further comprises an insulating layer 14 so as to inhibit dissipation of heat into a tyre mounted on the rim 6 of the wheel 2.

Referring back to FIG. 9, when the coil pack 13 is placed in position 2, it sits radially inward and adjacent to the second portion 10 of the rim 6, which comprises material with high magnetic anisotropy. The arrangement of the coil pack 13 within the rotating magnetic material in the second portion 10 effectively forms an alternator. When the wheel 2 rotates about the coil pack 13, relative movement of the stator(s) within the magnetic field induce a current.

Finally, referring again to FIG. 9, the coil pack 13 may be placed in a third position, labelled position 3, in which the coil pack 13 is displaced so that it is radially within and adjacent to both the first and second portions 9, 10 of the rim 6. This arrangement offers little benefit where the coil pack 13 comprises a single stator. However, where the coil pack 13 comprises two or more stators, for example as shown in FIG. 4, this arrangement offers a marked benefit. In this case, the first stator 12*a* is positioned radially within and adjacent to the first portion 9 of the rim 6, whereas the second stator 12*b* is position radially within and adjacent to the second portion 10 of the rim 6. Accordingly, eddy current braking and power generation may be performed simultaneously. When the wheel 2 is rotating, a current may be supplied to the first coil 12*a* generating resistive electromotive forces between the first stator 12*a* and the first portion 9 of the rim 6, whilst current is generated in the second stator 12*b* due to the rotation of the magnetic material in the second portion 12*b*. Further, with the coils positioned in position 3, current generated in the second stator 12*b* may be provided to the first stator 12*a* to increase the electromotive force due to eddy current braking.

In the arrangement described above, current is induced in each of the coils 15 in the second stator 12*b* by the interaction of the coils 15 with the magnetic second portion of the rim 6. However, in an alternative regime, the combination of the coils 15 and the second portion 9 of the rim 6 may be operated as a brushless DC motor. Accordingly, each of the coils 15 are driven independently, using any regime known in the art in relation to brushless DC motor operation, so as to provide a rotational force on the magnetic second portion 10 of the rim 6. To provide a braking force, this rotational force may be in the opposite direction the direction of rotation of the rim 6 of the wheel 2. A simple control circuit known in the art includes three bi-directional outputs which are controlled by logic. However, a microcontroller may be used to manage acceleration, control speed and fine tune efficiency of the braking force provided. This DC brushless motor arrangement may also be operated during taxiing of an aircraft or vehicle to provide forward motion of the wheels at low speed.

Methods of operating the brake assembly described above will now be described in accordance with embodiments of the present invention. In particular, methods of operation of the brake assembly will be described in relation to braking wheels of an aircraft landing gear on landing of an aircraft on a runway. It will be appreciated, however, that the braking regimes described herein, and variations thereon, may be implemented in brake assemblies integrated into any suitable vehicle.

Figure 10:
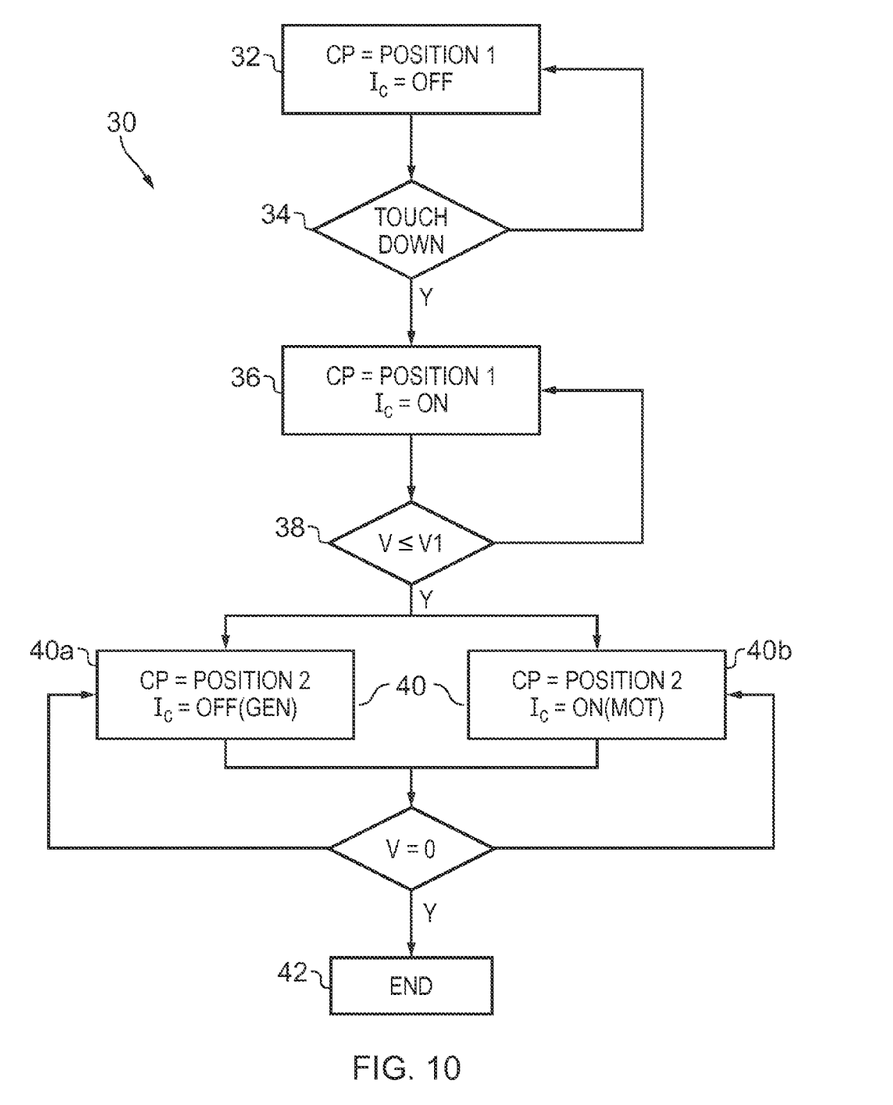
FIG. 10 is a flow diagram of a aircraft braking process according to an embodiment of the present invention.
Figure 11:
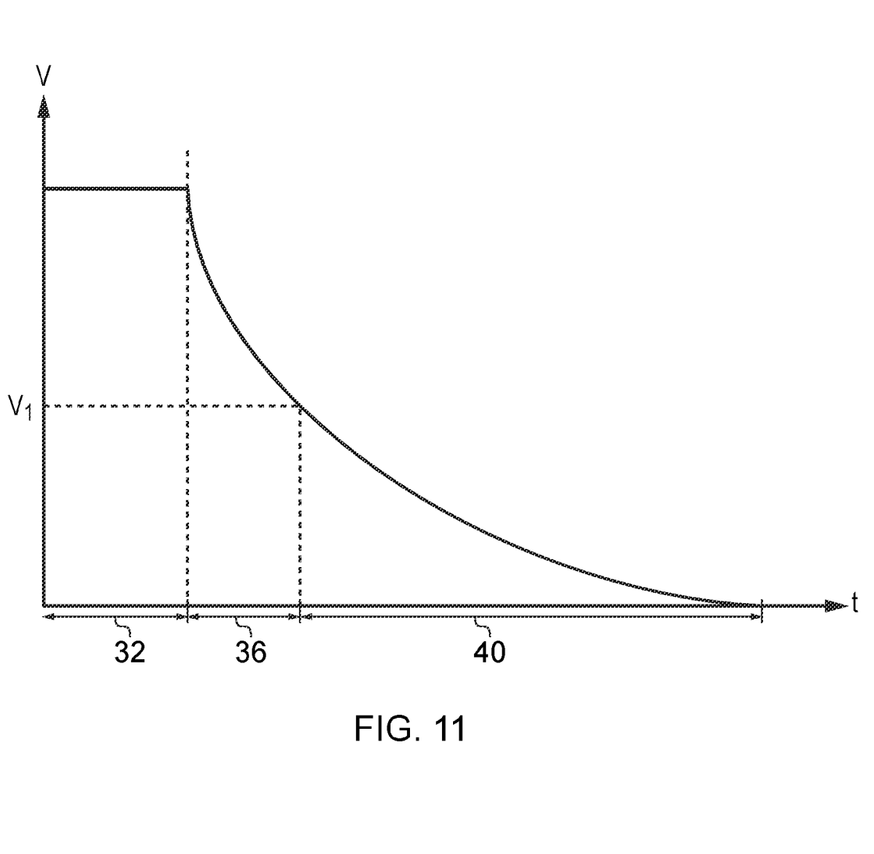
FIG. 11 is a velocity vs. time graph showing an aircraft's velocity during different states of the aircraft braking process shown in FIG. 10.

FIG. 10 is a flow diagram of an aircraft braking process 30 according to an embodiment of the present invention. A corresponding velocity vs. time graph is shown in FIG. 11 which graphically illustrates the typical velocity of an aircraft whilst landing. The aircraft braking process 30 may be performed by the brake assembly 1 described in any of FIGS. 1 to 8. In FIG. 10, CP refers to the coil pack 13, and the relative positions (Position 1-3) relate to those positions shown in FIG. 9.

The aircraft braking process 30 begins with an in-air state 32, in which the coil pack 13 is positioned in position 1 in a full eddy braking mode, with no current supplied to the coil(s). The system then awaits a touchdown event 34, in which the wheel 2 touches down on a runway. Until a touchdown event 34 occurs, the coil pack 13 is maintained in position 1, with no excitation current supplied to the coil pack 13.

When a touchdown event 34 occurs, the aircraft braking process 30 moves into a full eddy braking state 36, wherein electrical power is supplied to the coil pack 13 inducing an electromotive force on the rim 6 of the wheel 2 resisting forward rotation of the wheel 2.

The level of current supplied to the coil(s) of the coil pack 13 may be fixed or variable, so that the level of braking force applied to the wheel 2 at a known speed can be altered as required, using a suitable control system known in the art. The current may be variably applied to some or all of the coils in each stator 12. Alternatively, to reduce the braking force applied to the wheel, current may only be supplied to some of the coils in each stator 12, or switched off depending on braking demand.

As mentioned above, the braking force associated with the induced eddy currents is proportional to the speed of rotation of the wheel. Accordingly, as the angular velocity of the wheel 2 reduces, the braking force will also reduce. Thus, eddy current braking provides the advantage that the brake is self-modulating. Accordingly, accurate speed and position information necessary for anti-skid systems used in state of the art frictional braking systems may not be required.

The aircraft braking process 30 monitors 38 the velocity of the aircraft as it reduces due to the applied eddy braking force and other resistive forces. While the aircraft is above a first threshold velocity V1, the coil pack 13 remains in position 1 with excitation current applied. The first threshold velocity V1 is preferably set at a velocity directly proportional to the angular velocity of the wheel 2 at which the electromotive force generated by the eddy brake is below the necessary force required to provide a substantial braking force on the wheel 2. At which point, other braking systems, such as friction brakes, may be required to provide the necessary braking force to decelerate the aircraft. For example, coils 15 in conjunction with the second portion 9 of the rim 6 may be driven as a brushless DC motor. As soon as the aircraft velocity falls below V1, with the eddy brake no longer providing sufficient braking force to decelerate the aircraft, the aircraft braking process 30 adopts a power generation/motor state 40, in which the coil pack 13 is moved into position 2, the outer edge of the coil pack 13 positioned radially inward and adjacent to the magnetic portion 10 of the rim 6. The assembly may then operate in one of two modes. In a first mode 40a, the excitation current to the coil pack 13 is removed. As the wheel 2 rotates about the coil pack 13, a current is induced in each of the coil pairs 15 which may be stored or used to power other aircraft equipment. For example, stored power may be used to operate the cabin climate control, even once the engines have been shut down.

Alternatively, the aircraft braking process can dynamically drive the coil pairs 15 so as to induce a rotational force on the rim in a direction opposite to the rotation of wheel 2, thus providing a braking force on the wheel 2. In this configuration, the arrangement acts as a brushless DC motor, driven in reverse. The skilled person will be aware of the various control regimes known in the art for driving the arrangement so as to induce a rotational force in the rim 6.

The aircraft braking process 30 continues to monitor the velocity of the aircraft during braking. When the aircraft comes to a complete standstill on the runway, the aircraft braking process 30 ends 42.

Figure 12:
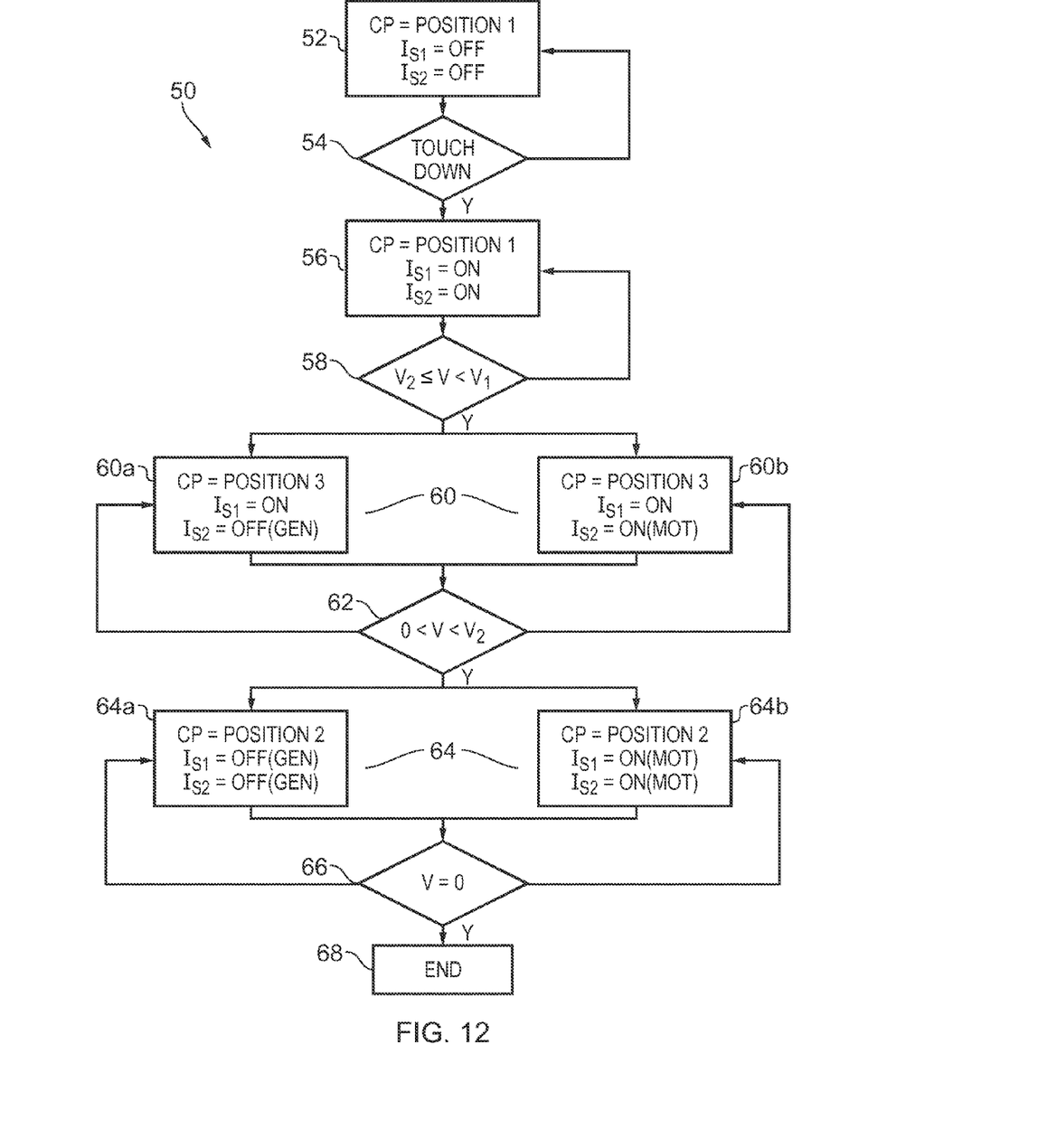
FIG. 12 is a flow diagram of a aircraft braking process according to an embodiment of the present invention.
Figure 13:
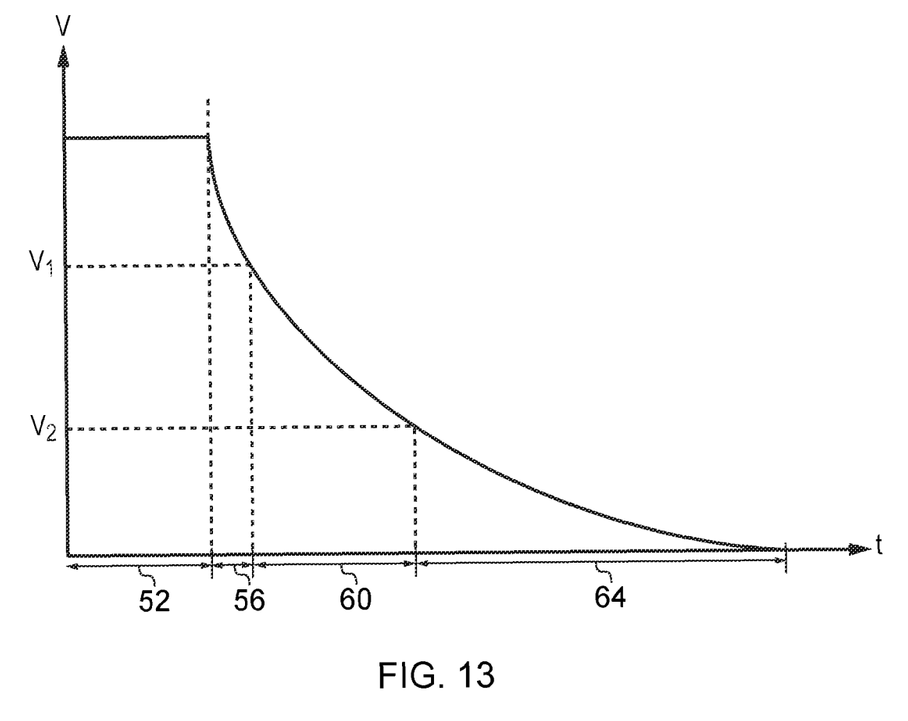
FIG. 13 is a velocity vs. time graph showing an aircraft's velocity during different states of the aircraft braking process shown in FIG. 12.

FIG. 12 shows a modified aircraft braking process 50 adjusted specifically for a coil pack 13 comprising two or more stators 12. A corresponding velocity vs. time graph is shown in FIG. 13 which graphically illustrates the typical velocity of a landing aircraft. The aircraft braking process 50 may be performed by the brake assembly 1 described in any of FIGS. 1 to 8. As explained above, CP refers to the coil pack 13, and the relative positions (Position 1-3) relate to those positions shown in the schematic diagram in FIG. 8.

The aircraft braking process 50 begins with a in-air state 52, in which the coil pack 13 is positioned in position 1 in a full eddy braking mode, with no current supplied to either of the stators 12. The system then awaits a touchdown event 54, in which the wheel 2 touches down on a runway. Until a touchdown event 54 occurs, the coil pack 13 is maintained in position 1, with no excitation current Is1, Is2 supplied to the stators 12.

When a touchdown event 54 occurs, the aircraft braking process 50 moves into a full eddy braking state 56, wherein electrical power is supplied to the coils of both stators 12 of the coil pack 13, inducing an electromotive force on the rim of the wheel 2 resisting forward motion of the wheel 2.

The level of current Ic1, Ic2 supplied to the stators 12 of the coil pack 13 may be fixed or variable, so that the level of braking force applied to the wheel 2 can be altered as required, using a suitable control system known in the art. The current may be variably applied to some or all of the coils in each stator 12. Alternatively, to reduce the braking force applied to the wheel, current may only be supplied to some of the coils in each stator 12, or switched off depending on braking demand.

The aircraft braking process 50 monitors 58 the velocity of the aircraft as it reduces due to the applied eddy braking and other resistive forces. While the aircraft is above a first threshold velocity V1, the coil pack 13 remains in position 1 with excitation current applied to both stators 12 of the coil pack 13. The first threshold velocity V1 is may be set at a velocity directly proportional to the angular velocity of the wheel 2 at which the electromotive force generated by the eddy braking from both stators 12 is below the necessary required to provide a substantial braking force on the wheel. At which point, other braking regimes may be required to provide the necessary braking force to decelerate the aircraft. As soon as the aircraft velocity falls below V1, with the force provided by the two stators 12 no longer providing sufficient braking force to decelerate the aircraft, the aircraft braking process 30 adopts a mixed braking state 60. The coil pack 13 is moved into position 3 as shown in FIGS. 5 and 8, the outer edge of one or the stators 12a in the coil pack 13 positioned radially inward and adjacent to the conductive first portion 9 of the rim 6, the outer edge of another of the stators 12b in the coil pack positioned radially inward and adjacent to the magnetic second portion 10 of the rim 6. The stator 12a adjacent to the conductive first portion 9 continues to be supplied with an excitation current Is1 which provides an eddy braking force to the wheel 2. However, the stator 12b adjacent to the magnetic second portion 10 is operated in one of two modes 60a, 60b.

In a first mode 60a, excitation current Is2 to the stator 12b adjacent to the magnetic second portion 10 of the rim 6 is removed, the stator 12b instead operating in a power generation state. Thus, the modified aircraft braking process 50 may be operated so that both eddy braking and power generation take place simultaneously within brake assembly 1. Advantageously in this mode 60a, current induced in the coils of the stator 12b adjacent to the magnetic second portion 10 of the rim 6 may be fed into the stator 12a adjacent to the first portion 9 of the rim to increase the excitation current Is1 in the coils of the stator 12a. Alternatively, current induced in the coils of stator 12b may be stored or used to power other aircraft equipment.

In an alternative second mode, the aircraft braking process 50 dynamically drives the coil pairs 15 so as to provide a rotational force on the rim in a direction opposite to the rotation of the wheel 2, thus providing a braking force on the wheel 2. The skilled person will, again, be aware of the various control regimes known in the art for driving fixed stators so as to provide a rotational force to commutate a brushless DC motor arrangement.

While the brake assembly is in either of the mixed braking modes 60a, 60b, the aircraft braking process 50 continues to monitor 62 the velocity of the aircraft. When the aircraft velocity is reduced below a second threshold voltage V2, the brake assembly 1 is moved into a full power generation/motor state 64, in which the coil pack 13 is moved into position 2, the outer edge of both stators 12a, 12b of the coil pack 13 positioned radially inward and adjacent to the magnetic portion 10 of the rim 6. Concurrently, stator 12a is operated in either of the first or second modes 64a, 64b described above in relation to stator 12b. In the first mode 64a the excitation current to the stator 12a is removed. Both stators 12a, 12b then act in a power generation mode, in which current is induced in the coils 15 of the both stators 12a, 12b which may be stored or used to power other aircraft equipment. Alternatively, one or both of the stators 12a, 12b are operated in the second mode, in which coil pairs 15 are dynamically controlled so as to provide a reverse torque on the rim 6 and an associated braking force. As a further alternative (not shown) one stator 12 may be operated in a generation mode, whilst the other is operated in a DC brushless mode. Thus, power generation and applied electromagnetic braking may take place simultaneously.

The aircraft braking process 50 continues to monitor 66 the velocity of the aircraft during braking. When the aircraft comes to a complete standstill on the runway, the aircraft braking process 50 ends 68.

It will be appreciated that both aircraft braking processes 30, 50 may vary in their implementation. For example, the process may not require the aircraft to come to a complete standstill in order to end. Often on landing, aircraft reduce their speed to a threshold suitable for taxiing and do not come to a complete standstill until parked at a terminal or hanger.

Monitoring of the velocity of the aircraft described herein may be achieved by monitoring the angular velocity of the wheel 2 of the brake assembly 1. Advantageously back EMF induced in any un-driven coils can be used to infer the position and velocity of the rim 6 in relation to the coil pack 13, eliminating the requirement of sensors to directly measure position and velocity. Accordingly, no extra apparatus is required to monitor rotation of the wheel 2. Alternatively, hall effect sensors or rotor encoders for measuring wheel position and velocity may be integrated into the brake assembly design.

As stated above, the combination of stators 12a, 12b and the magnetic second portion of the rim 6 may be controlled so as to operate as a brushless DC motor. Control and operation of brushless DC motors is know in the art. Brushless DC motors can provide forward drive with high torque at low speeds suitable for taxiing the aircraft. Accordingly, once the aircraft braking processes 30, 50 have completed, forward or reverse drive modes can be implemented. Main engines could then be powered down, and power for taxiing provided solely to the aircraft wheels via respective brake assemblies. Further, the use of tugs to tow and push-back aircraft at terminals could be eliminated.

The forward drive mode can also be utilised prior to landing of the aircraft to initiate rotation of the wheel 2 before touch down of the aircraft, thereby reducing spin up and spring back loads on the landing gear.

The invention provides several advantages over prior art braking systems:

A vehicles own kinetic energy is used to power the landing gear brakes, saving energy and reducing fuel burn associated with powering standard hydraulic brakes;

Landing gear wheels can be pre-rotated prior to landing so that spin-up and spring back-loads can be reduced. Accordingly, landing gears can be made lighter since less reinforcement is required to account for such loads;

Braking using the braking assembly described herein is predominantly electric, converting landing energy to heat via eddy braking; reducing or eliminating otherwise required replacement of wearing components;

A wheel can be driven forward or backward electrically using the same apparatus as that used to provide braking;

The brake assembly shares almost all of the electrical machine components required for motor and braking functions, thereby reducing both weight and complexity.

The invention claimed is:

1. A brake assembly for a vehicle comprising:
a wheel comprising a hollow section and a rim, the rim comprising a first portion comprising an electrically conductive material and a second portion adjacent to the first portion comprising a plurality of a permanent magnets; and
at least one stator comprising at least one electromagnetic coil arranged to be located within the hollow section of the wheel;
wherein the at least one stator is moveable between a first position in which the at least one electromagnetic coil is inductively coupled to the first portion of the rim when the wheel is rotating relative to the stator, and a second position in which the at least one electromagnetic coil is inductively coupled to the second portion of the rim.

2. A brake assembly according to claim 1, wherein in the first position, the at least one stator is aligned with the majority of the first portion of the rim.

3. A brake assembly according to claim 1, wherein in the second position, the at least one stator is aligned with the majority of the second portion of the rim.

4. A brake assembly according to claim 1, wherein the brake assembly comprises at least two stators each comprising at least one electromagnetic coil, the at least two stators being moveable into a third position in which at least one electromagnetic coil is inductively coupled to first portion and a different one of the at least one electromagnetic coils is inductively coupled to the second portion.

5. A brake assembly according to claim 1, wherein the first portion of the rim is separated from an outer surface of the rim by an insulating material.

6. A brake assembly according to claim 1, wherein the wheel comprises thermally conductive material arranged to dissipate heat generated by electromagnetic interactions between the at least one electromagnetic coil and first and/or second portions of the rim.

7. A brake assembly according to claim 1, wherein the at least one stator is moveable in a direction parallel to the rotational axis of the wheel.

8. A brake assembly according to claim 1, wherein movement of the at least one stator is actuated by an electrical, mechanical, or hydraulic actuator.

9. A brake assembly according to claim 8, wherein the actuator is a linear actuator or a rotational actuator.

10. A brake assembly according to claim 1, wherein movement of the at least one stator is driven by a screw actuator which engages with a thread integral to the inside surface of one or more of the or each stator.

11. A brake assembly according to claim 1, further comprising a coil control module coupled to at least one of the electromagnetic coils.

12. A brake assembly according to claim 11, wherein the coil control module is configured to receive and/or provide power to the at least one of the electromagnetic coils.

13. A brake assembly according to claim 12, wherein the brake assembly comprises at least two stators each comprising at least one electromagnetic coil, and wherein the coil control module is coupled to at least two electromagnetic coils and is configured to receive and/or provide power to at least two of the electromagnetic coils independently.

14. A brake assembly according to claim 1, further comprising a friction brake comprising a first brake element integral to the at least one stator and a second brake element attached to or integral to a fixed portion of the vehicle and wherein the at least one stator is moveable into a braking position in which the first brake element engages with the second brake element to inhibit rotation of the wheel.

15. A brake assembly according to claim 1, wherein the vehicle comprises an aircraft.

16. A method of operating a brake assembly, the brake assembly comprising a wheel, the wheel comprising a hollow section and a rim, the rim comprising a first portion comprising an electrically conductive material and a second portion adjacent to the first portion comprising a plurality of a permanent magnets, at least one stator comprising at least one electromagnetic coil arranged to be located within the hollow section of the wheel, and wherein the at least one stator is moveable between a first position in which the at least one electromagnetic coil is inductively coupled to the first portion of the rim when the wheel is rotating relative to the stator, and a second position in which the at least one electromagnetic coil is inductively coupled to the second portion of the rim, the method comprising:

during a first phase in which the wheel is rotating at a first angular velocity, moving at least a first one of the at least one stator into the first position and applying a current to at least one of the electromagnetic coils inductively coupled to the first portion of the rim, so as to induce eddy currents in the first portion of the rim;

during a second phase in which the wheel is rotating at a second angular velocity, the second angular velocity being less than the first angular velocity, moving the first one of the at least one stator into the second position wherein at least one of the electromagnetic coils is inductively coupled to the second portion of the rim.

17. A method according to claim 16 wherein during the second phase the rim induces an electric current in the at least one electromagnetic coil.

18. A method according to claim 17 wherein the electric current induced in the at least one electromagnetic coil coupled to the second portion of the rim contributes to the current applied to the at least one electromagnetic coils coupled to the first portion of the rim.

19. A method according to claim 16 wherein during the second phase a current is applied to the at least one electromagnetic coil to induce a rotational force on the rim in a direction opposite to the direction of rotation of the wheel.

20. A method according to claim 16, further comprising:
during a third phase occurring between the first phase and the second phase, moving the at least one stator into a third position in which:
an electromagnetic coil associated with a first one of the at least one stator is applied with a current and is inductively coupled to the first portion of the rim, and
an electromagnetic coil associated with a second one of the at least one stator is inductively coupled to the second portion of the rim.

21. A method according to claim 20, further comprising:
during a fourth phase in which the at least one stator is in the second or the third position, driving at least one of the electromagnetic coils coupled to the second portion of the rim so as to induce a rotational force on the rim.

22. A method according to claim 16, further comprising:
during a fifth phase occurring before the first phase in which the one or more stators are in the second position, applying a current to at least one of the electromagnetic coils coupled to the second portion of the rim so as to induce a rotation force on the rim so as to increase the angular velocity of rotation the wheel.

* * * * *